May 26, 1931. L. T. FREDERICK 1,807,206
MICA LAYING APPARATUS
Filed June 18, 1928 2 Sheets-Sheet 1
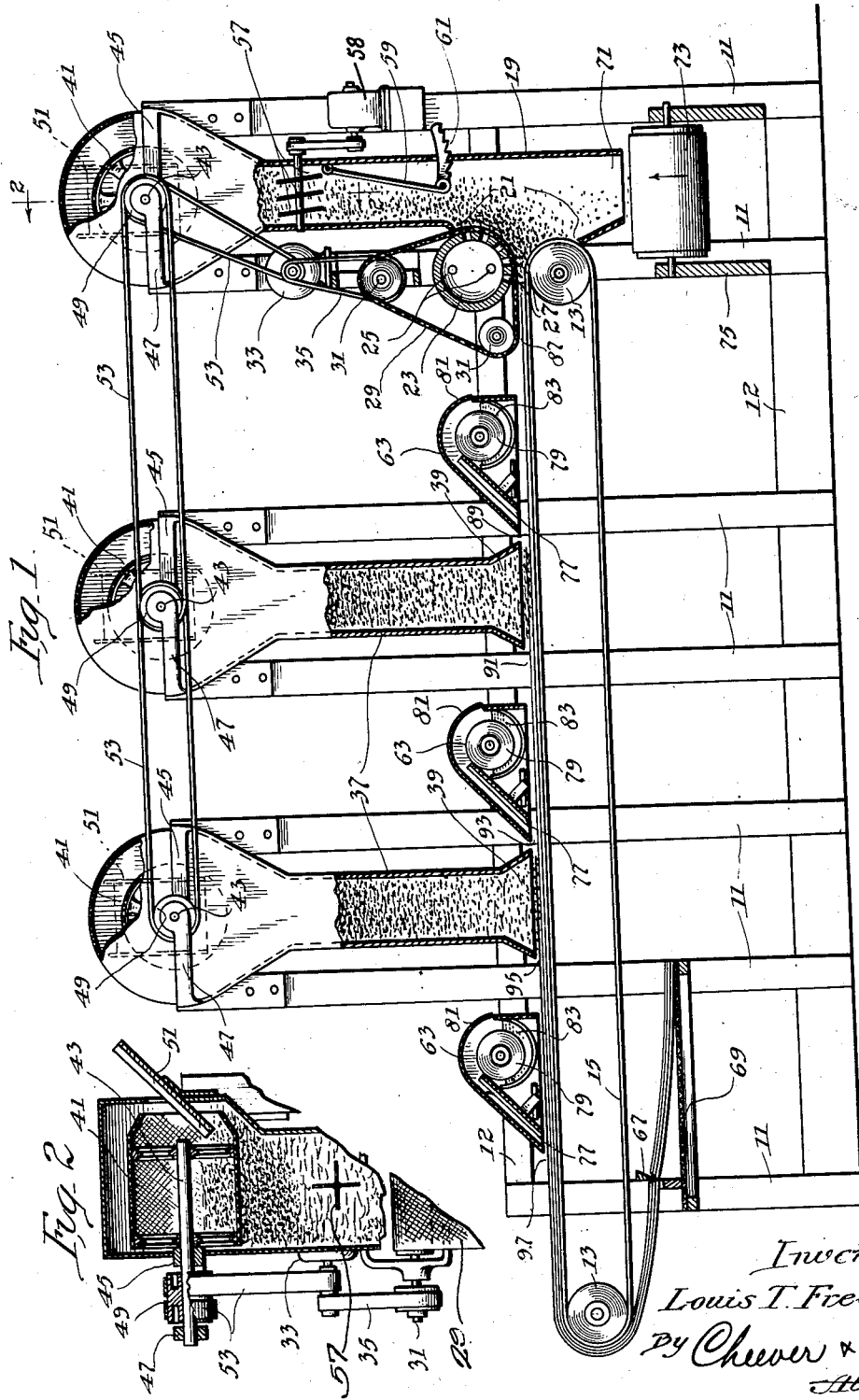
Inventor:
Louis T. Frederick
By Cheever & Cox
Attys.

May 26, 1931. L. T. FREDERICK 1,807,206
MICA LAYING APPARATUS
Filed June 18, 1928 2 Sheets-Sheet 2
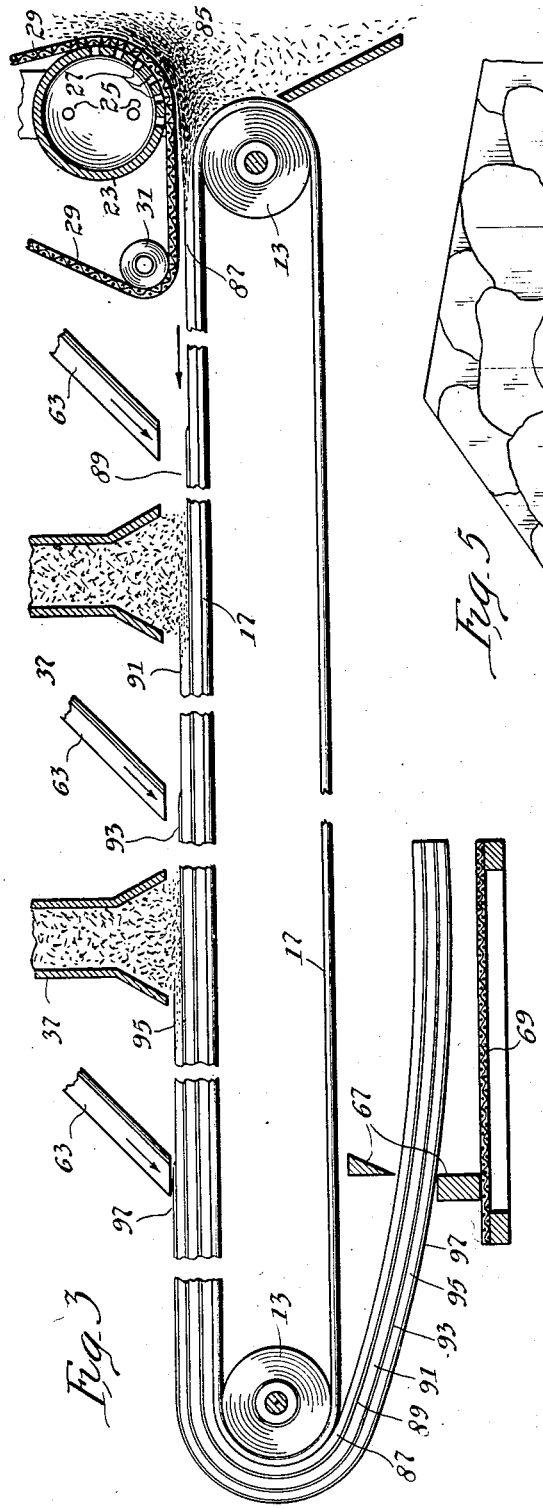
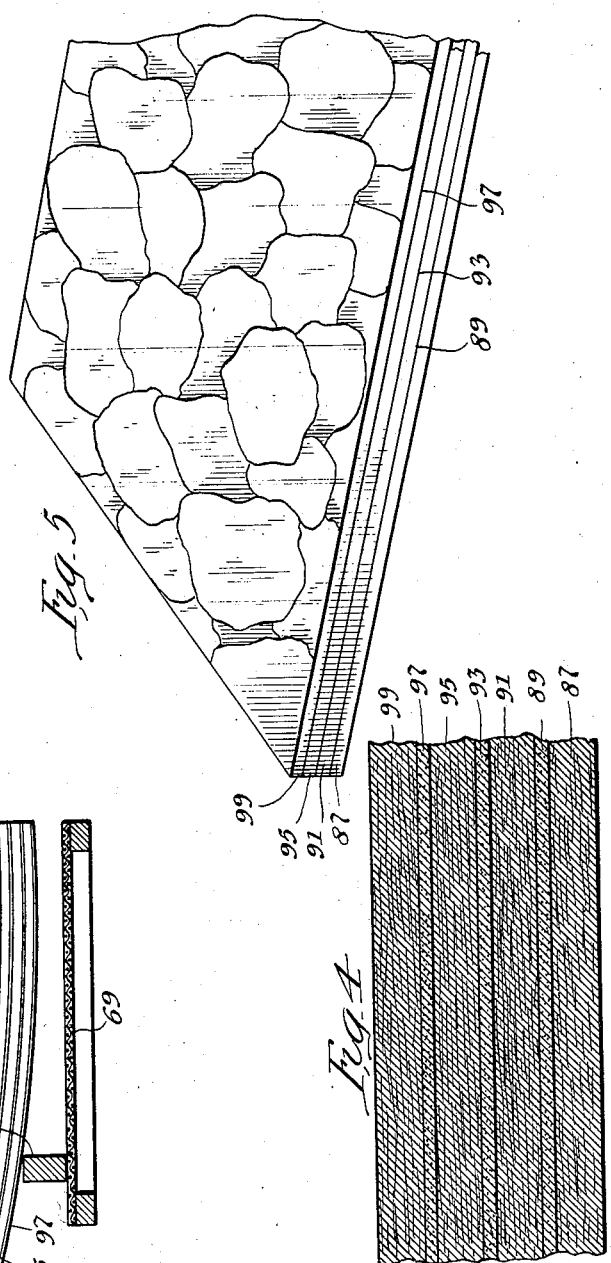
Inventor:
Louis T. Frederick
By Cheever & Cox
Attys.

Patented May 26, 1931

1,807,206

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MICA LAYING APPARATUS

Application filed June 18, 1928. Serial No. 286,316.

My invention relates in general to apparatus for making laminated sheets built up from comminuted or subdivided matter, and particularly flaked mica, and has more particular reference to the provision of a machine for building up substantially thick mica plates or sheets of substantially uniform thickness.

Mica plate has been produced in the past by depositing mica flakes as uniformly as possible upon a surface and thereafter sprinkling a suitable bond such as shellac, glyptol or the like upon the deposited flakes and finally consolidating the whole into a thin sheet. Any desired number of these sheets may then be secured together to produce a sheet of desired thickness. Uniform thickness is highly desirable in laminated sheets of this general nature particularly when the sheets are used for insulating purposes in electrical machinery and the like.

In order to produce laminated sheets of uniform thickness, it has been the practice to produce the laminations and thereafter paste additional mica flakes by hand upon the thinner portions and thus to build up a sheet having substantially uniform thickness. This, it will be appreciated, requires considerable time and skill on the part of the operator in pasting. In my co-pending application, Serial Number 139,219, filed October 2, 1926, I have shown and described a means and method of producing a substantially uniform mica sheet with a minimum of additional manual pasting. This process is capable of producing a mica sheet consisting of not more than two superimposed layers of mica flakes, a number of which may thereafter be assembled together to form a laminous plate of desired thickness. The principal advantage of the invention illustrated in my aforesaid co-pending application is that a substantially uniform double layer lamination, requiring a minimum of additional pasting, may be produced in a single operation.

It is very apparent that the process of making a mica plate which involves making individual mica plates, pasting them to insure uniform thickness, and, finally, assembling and compacting the pasted laminations into a solid sheet is a costly process since it involves intermediate steps.

One important object of my present invention is to provide a machine which will produce a mica plate or sheet consisting of several laminations and having substantially uniform thickness without the intermediate production and assembly of separate laminations, and requiring a minimum of additional pasting of extra flakes to build the plate to substantially uniform thickness.

Another important object of my present invention is to provide a novel method of producing multiple layer plates or sheets from flaked mica and the like whereby a plate or sheet of substantially uniform thickness, requiring a minimum of additional pasting may be produced in a single operation.

Still another important object of my present invention is to provide a machine for building a multiple layer sheet of flaked mica and the like which forms a substantially uniform lower layer and thereafter deposits additional non-uniform layers upon said uniform layer.

Numerous objects and advantages of the invention will be apparent as it is more fully understood from the following description which, taken in connection with the accompanying drawings discloses a preferred embodiment of the invention.

Referring to the drawings:

Figure 1 is a vertical cross section taken longitudinally of the apparatus of my invention and illustrating its operation diagrammatically;

Figure 2 is a vertical cross section taken substantially along the line 2—2 in Figure 1;

Figure 3 is an enlarged view of portions of the apparatus illustrated in Figure 1;

Figure 4 is an enlarged vertical cross section taken through the laminated sheet as it comes from the apparatus; and Figure 5 is an enlarged perspective view of a sheet after having an additional pasted layer of flakes added by hand.

To illustrate my invention I have shown on the drawings an improved mica laying apparatus. This apparatus is adapted to form a laminated product comprising a substantially uniform layer of selected mica flakes, and one or more layers of unsorted flakes superposed on the uniform layer, the layers being secured together by means of a suitable binder which may be any of the well known mica binders such as shellac or the reaction product of glycerine and phthalic anhydride. The apparatus for accomplishing this result is arranged in a main supporting frame comprising a plurality of vertical support members 11 secured in spaced relationship by means of horizontal connecting members 12. The supporting frame carries a conveyor in position to receive a substantially uniform layer of mica flakes from a suction apparatus including a suction drum 23 which selects a substantially uniform grade of mica flakes from an adjacent channel 19. The frame also supports channels 37 having discharge openings 39 in position to deposit a cloud of mica flakes in the conveyor The conveyor comprises an endless belt carried by spaced rollers 13 suitably mounted in the main supporting frame in such position that the upper stretch 17 of the belt passes successively beneath the suction apparatus, a binder depositing device 63, the discharge orifice of a channel 37, a second binder device, the discharge orifice of a second channel 37 and finally beneath a third binder depositing device 63. It will be apparent, of course, that the channels 37 and the binder depositing devices 63 may be repeated in order to obtain a thicker laminated product, each channel 37 being adapted to deposit a layer of mica flakes upon the conveyor and each binder depositing device being adapted to interpose a film of the binder material between superposed layers. Each of the channels 37 and 19 is provided at the upper end with a mica tumbling and snowing apparatus which comprises a foraminated drum 41 mounted on a shaft 43 which is journaled in bearings 45 and 47 suitably supported from uprights 11 of the main frame. The tumbling drum 41 is similar to that illustrated and described in my co-pending application, Serial Number 139,288 filed October 4, 1926. A chute 51 is provided for introducing mica flakes into the tumbling drum, and upon rotation of the drums, a cloud of mica flakes is snowed into and through the channels 37 and 19 which extend therebelow. The drums are rotated by means of pulleys 49 which are secured to the shafts 43 intermediate the bearings 45 and 47 and belts 53 which connect the driving pulleys 49 with a suitable source of driving power which, in the present instance comprises a motor 33 suitably supported in the main frame. The channel 19 extends downwardly past one end of the upper stretch 17 of the conveyor and has an opening 21 into which the roller 13 at one end of the conveyor partially enters. The opening 21 extends substantially above the top of the roller and the additional space is filled by a stationary cylinder 23 which comprises a portion of the suction apparatus heretofore mentioned and which is provided with a plurality of apertures or foraminations 27 which are formed through the surface of the roller which is presented to the opening 21. The cylinder 23 is provided with connections 25 whereby it may be attached to a pump or similar device for exhausting the air from the cylinder to thus create a draft inwardly through the foraminations 27. As the stream of mica flakes pass downwardly through the channel 19 they come in contact with agitators or kickers 57 which comprise cross-arms mounted upon a shaft which is rotated by a suitable connection with the driving motor 58. After passing these kickers which throw the flakes about and assist in splitting up the thicker flakes, the mica passes downwardly in the channel, being deflected towards the opening 21 by means of the pivoted plate 59 which is provided with an adjusting member 61 for varying the deflection imparted to the stream of mica flakes in the channel. The draft of air created through the foraminations 27 in the suction drum 23 will select and draw the thicker, lighter flakes from the stream of mica as it passed the opening 21 on to the surface of the cylinder 23. In order to remove and deposit these selected flakes I have provided a continuous foraminated belt 29 which passes around the cylinder 23 and rollers 31. The flakes are attracted to the outer surface of this belt as it passes around across the foraminated portion of the cylinder and carries the selected flakes to a point above the upper stretch 17 of the conveyor 15. At this point the belt passes away from the influence of the suction apertures 27 and strips the flakes therefrom. The flakes are thus deposited in the upper stretch of the conveyor 15. The foraminated belt 29 is connected by means of a drive belt 35 to the motor 33, and the conveyor 15 is also driven by means of a drive connection (not shown) at a linear speed substantially equal to that of the belt 29 so that the mica flakes deposited thereon may form a substantially uniform layer upon the upper stretch 17 of the conveyor.

It will be apparent, of course, that the conveyor 15 may be foraminated, if desired, and that a suction drum, similar to the cylindrical member 23, substituted for the inner roller 13, so that the lower uniform layer, deposited in the conveyor, may comprise a double layer of flakes as in my aforesaid co-pending application Serial No. 139,219.

After passing from the suction apparatus just described, the belt carrying the substantially uniform layer of selected mica flakes passes beneath the discharge nozzle 77 of a binder dispenser 63 which, in the illustrated embodiment, comprises a cylindrical roller 79, rotatably supported within a casing 81 and arranged to dip into a bath 83 of the binder solution contained in the casing, and a binder distributor comprising a chute engaging the roller 79 at its upper end and having its lower end 77 arranged to discharge the binder, received from the roller, onto the conveyor. By means of these devices a film of a suitable binding material may be deposited upon each layer of mica in the conveyor as it passes beneath the devices.

It will be apparent that any desired binder may be arranged in the dispensers 63 and I may place different binders in successive devices in order to obtain a more desirable product such as the combination glyptol-shellac product described in the application Serial No. 201,285, filed June 24, 1927.

From beneath the orifice 77 of the first dispenser, the conveyor passes beneath the discharge orifice 39 of the snowing device 37 at which point it receives a layer of unsorted mica which is snowed down upon the binder saturated layer deposited by the suction device. Thereafter the conveyor passes consecutively beneath a second binder dispenser 63, the discharge orifice of a second snowing device and finally under the discharge nozzle of a third binder dispenser. The binder dispensers 63 are all suitably supported from the main supporting frame and are arranged so that their discharge nozzles may spray a film of the binder material upon the layer of mica flakes deposited in the conveyor. In operation, the suction apparatus draws the lighter flakes 85 from the stream in the channel 19. These flakes are deposited in a substantially uniform layer 87 on the conveyor, for it is apparent that as soon as one layer of flakes is drawn onto the screen 29, the suction therethrough will be cut off so that additional flakes will not be drawn thereon. A film of binder 89 is next deposited and then two layers 91 and 95 of snowed flakes with films 93 and 97 of binder sprayed thereon, are deposited consecutively upon the uniform layer. The binder film 97 is on the upper surface of the sheet so that it can be immediately subjected to a manual pasting operation in order to provide a uniform product. The mica product thus formed comprises a continuous laminated sheet comprising a substantially uniform layer of mica flakes, and one or more substantially non-uniform layers secured together by films of suitable mica binding material. The sheet of mica is passed around the outer roller 13 and is drawn between the co-operating portions of a shearing device 67 which is adapted to operate at intervals in order to cut off a desired length of the mica sheet which, being cut, drops upon a receiver 69 suitably carried in the main supporting frame and on which the portion so cut may be operated by hand or a suitable connection may be formed whereby the driving motor 33 may operate the mechanism at intervals in order to automatically cut off the desired length of the product.

In Figures 4 and 5 I have shown diagrammatically the appearance of the laminated sheet produced by this machine. Although the shellac is shown in Figure 4 as being in distinct layers 89, 93 and 97, it should be understood that these layers are not clearly defined as such but that the shellac permeates the adjacent mica layers more or less uniformly due to capillary attraction, so that the resulting sheet is a substantially homogeneous mass composed of mica flakes and the shellac binder.

The composite mica sheet as produced by the mica laying machine has a coat of shellac 97 applied to its upper face and the sheet may be transferred to a suitable device in which an upper layer 99 of mica flakes may be pasted by hand to the thin spots in the sheet. These thin spots are determined by placing the sheet over a source of light. The flakes comprising the layer 99 are then pasted over the portions of the sheet which show light until the sheet appears uniform throughout.

The lower end 71 of the channel 19 is open and the mica which is not drawn from the stream of flakes passing therethrough by the suction apparatus, is discharged through this end and falls upon a suitable conveyor 73 which is arranged to withdraw the excess mica from the apparatus whence it may be fed again into the tumbling drums 41.

It is thought that the invention and many of its attendant advantages will be understood from the foregoing description and it will be apparent that various changes may be made in the form, construction and arrangement of the parts without departing from the spirit and scope of the invention or sacrificing any of its material advantages, the form herein described being merely a preferred embodiment of the invention.

Having thus described my invention, what I claim as new and desire to secure by Letters Patent is:

1. In a mica laying machine in combination, a mica receiver adapted to carry a layer of mica flakes, means for selecting and depositing a substantially uniform layer of mica flakes in said receiver, said means comprising means forming an enclosed chamber having an opening in its sides, means for creating a cloud of tumbling mica flakes in the chamber, a suction device extending in the opening of the chamber whereby to select the lighter flakes from the cloud therein and a transfer device comprising a foraminous conveyor extending in the opening aforesaid in front of the suction device in position to receive the selected flakes, remove same from the chamber and deposit same as a uniform layer in the receiver and means for snowing a layer of mica flakes into the receiver upon the substantially uniform layer of selected flakes.

2. In a mica laying machine in combination, a mica receiver adapted to support a layer of mica flakes, suction means for selecting and depositing a substantially uniform layer of uniform mica flakes in said receiver, said means comprising means forming an enclosed chamber having an opening in its sides, means for creating a cloud of tumbling mica flakes in the chamber, a suction device extending in the opening of the chamber whereby to select the lighter flakes from the cloud therein and a transfer device comprising a foraminous conveyor extending in the opening aforesaid in front of the suction device in position to receive the selected flakes, remove same from the chamber and deposit same as a uniform layer in the receiver means for snowing a second layer of mica flakes upon said uniform deposited layer to form a laminated mica structure, and means for depositing a film of a suitable mica binder upon a layer of mica flakes deposited in said receiver.

3. In a mica laying machine in combination, a mica receiver adapted to support a layer of mica flakes, means including a suction drum for selecting a substantially uniform grade of mica from an adjacent stream of mica flakes, and a foraminous conveyor for stripping said mica flakes from the suction drum and depositing the same in a substantially uniform layer in said receiver, means for depositing a film of a suitable mica binder upon a layer of mica flakes so deposited, and means for depositing a second layer of mica flakes upon said binder saturated layer in the receiver.

4. In a mica laying machine in combination, a mica receiver adapted to support a layer of mica flakes, means including a suction drum for selecting a substantially uniform grade of mica from an adjacent stream of mica flakes, and a foraminous conveyor for stripping said mica flakes from the suction drum and depositing the same in a substantially uniform layer in said receiver, and means for depositing a second layer of mica flakes upon said first layer in the receiver.

5. In a mica laying machine in combination, a mica receiver comprising a continuous conveyor arranged to travel around spaced rollers and adapted to support a layer of mica upon its upper stretch between said rollers, a foraminated suction member arranged above said conveyor adjacent one end thereof and adapted to select a substantially uniform grade of mica from a stream of mica flakes passing adjacent said member, means for stripping the flakes so selected from the foraminated member and for depositing the same in a substantially uniform layer in the conveyor.

6. In a mica laying machine in combination, a mica receiver comprising a continuous conveyor arranged to travel around spaced rollers and adapted to support a layer of mica upon its upper stretch between said rollers, a foraminated suction member arranged above said conveyor adjacent one end thereof and adapted to select a substantially uniform grade of mica from a stream of mica flakes passing adjacent said member, said stream of mica flakes being confined and directed in a predetermined path past said suction roller by means of a channel into which mica flakes may be introduced at a point above said suction member, said channel being open at a point opposite said member to expose the foraminated surfaces thereof to the stream of mica flakes, means for stripping the flakes so selected from the foraminated member, means for depositing the same in a substantially uniform layer in the conveyor, and means including a channel having a discharge orifice arranged in position to deposit a stream of mica flakes passing therethrough in the conveyor at a point spaced from the suction member whereby to lay a second layer of mica flakes in the conveyor upon the first layer selected by the suction member.

7. In a mica laying machine in combination, a mica receiver comprising a continuous conveyor arranged to travel around spaced rollers and adapted to support a layer of mica upon its upper stretch between said rollers, a foraminated suction member arranged above said conveyor adjacent one end thereof and adapted to select a substantially uniform grade of mica from a stream of mica flakes passing adjacent said member, means for stripping the flakes so selected from the foraminated member and for depositing the same in a substantially uniform layer in the conveyor, and means including a channel having a discharge orifice arranged in position to deposit a stream of mica flakes passing therethrough in the conveyor at a point spaced from the suction member whereby to lay a second layer of mica flakes in the conveyor upon the first layer selected by the suction member, means for introducing mica flakes into the channel, and means for depositing a film of a suitable mica binder over a layer of mica flakes in the conveyor.

8. In a mica laying machine in combination, a mica flake receiver, means including a substantially vertical chamber adapted to confine a stream of mica flakes and having a lateral opening, means for introducing mica flakes into the chamber, means for agitating the flakes in the chamber, suction means extending in said opening for selecting a uniform grade of mica flakes from the chamber, and means for depositing said selected flakes as a uniform layer in said flake receiver.

9. In a mica laying machine in combination, a mica flake receiver, means forming a chamber adapted to confine a stream of mica flakes and having a lateral opening, means for creating a cloud of mica flakes in the chamber, suction means extending in said opening for selecting a uniform grade of mica flakes, means for removing and depositing said selected flakes as a uniform layer in said receiver, and means including a channel for conducting a second stream of mica flakes and depositing the same as a layer in the flake receiver superimposed on the said previously deposited layer.

10. In a mica laying machine in combination, a mica flake receiver, means forming a substantially vertical chamber adapted to confine a stream of mica flakes and having a lateral opening, means for introducing the flakes into the chamber, suction means extending in said opening for selecting a uniform grade of mica flakes from the chamber, means for withdrawing and depositing said selected flakes as a uniform layer in said flake receiver, means for depositing a film of a suitable mica binder upon said layer so deposited, and means including a channel having a discharge orifice arranged over said receiver for snowing a layer of mica flakes in the receiver upon said previously deposited binder treated layer.

11. In a device of the class described, the combination of means forming an enclosed chamber having an opening in its sides, means in said chamber above said opening for creating a cloud of falling mica flakes in said chamber, a suction device extending in the opening of the chamber whereby to select the latter flakes from the cloud therein, and means formed and arranged in said chamber for directing the falling flakes therein toward said suction device.

12. In a device of the class described, the combination of means forming an enclosed chamber having an opening in its sides, means in said chamber above said opening for creating a cloud of falling mica flakes in said chamber, a suction device extending in the opening of the chamber whereby to select the latter flakes from the cloud therein and means including an inclined member formed and arranged in said chamber for directing the falling flakes therein toward said suction device.

13. In a device of the class described, the combination of means forming an enclosed chamber having an opening in its sides, means in said chamber above said opening for creating a cloud of falling mica flakes in said chamber, a suction device extending in the opening of the chamber whereby to select the latter flakes from the cloud therein, means including an inclined member formed and arranged in said chamber for directing the falling flakes therein toward said suction device, and means for adjusting said inclined member at a desired angularity in the chamber.

14. In a device of the class described, the combination of means forming an enclosed chamber having an opening in its sides, means in said chamber above said opening for creating a cloud of falling mica flakes in said chamber, a suction device extending in the opening of the chamber whereby to select the latter flakes from the cloud therein, means formed and arranged in said chamber for directing the falling flakes therein toward said suction device, and a transfer device comprising a foraminous conveyor extending in the opening aforesaid in front of the suction device in position to receive the selected flakes and means to shift said foraminous conveyor whereby to remove the selected flakes from the chamber through said opening.

15. In a device of the class described, the combination of means forming an enclosed chamber having an opening in its sides, means in said chamber above said opening for creating a cloud of falling mica flakes in said chamber, a suction device extending in the opening of the chamber whereby to select the latter flakes from the cloud therein, means formed and arranged in said chamber for directing the falling flakes therein toward said suction device, a transfer device comprising a foraminous conveyor extending in the opening aforesaid in front of the suction device in position to receive the selected flakes and means to shift said foraminous conveyor whereby to remove the selected flakes from the chamber through said opening, and angularly disposed means formed and arranged in said chamber for directing the falling flakes therein toward said suction device and the foraminous conveyor in order to vary the grade of mica flakes selected and removed thereby.

In witness whereof, I have hereunto subscribed my name.

LOUIS T. FREDERICK.